United States Patent

[11] 3,604,935

[72] Inventor Roy E. Nather
 Salano Beach, Calif.
[21] Appl. No. 812,457
[22] Filed Apr. 1, 1969
[45] Patented Sept. 14, 1971
[73] Assignee Beckman Instruments, Inc.
 Continuation of application Ser. No.
 541,674, Apr. 11, 1966, now abandoned.

[54] SIGNALLING MEMBER AND METHOD FOR PROGRAMMING AUTOMATIC RADIOACTIVITY-MEASURING SYSTEM
 4 Claims, 4 Drawing Figs.
[52] U.S. Cl. .................................................. 250/106,
 250/52, 250/219, 250/223, 250/715
[51] Int. Cl. ...................................................... G01t 1/17,
 G01t 7/02

[50] Field of Search............................................ 250/106
 SC, 223, 223 B, 52, 219 I

[56] References Cited
 UNITED STATES PATENTS
 3,227,886  1/1966  Dunigan et al................ 250/223
 3,246,156  4/1966  Frank et al.................... 250/106 SC Primary Examiner—Archie R. Borchelt
Assistant Examiner—Morton J. Frome
Attorneys—Paul R. Harder and Robert J. Steinmeyer ABSTRACT: Apparatus and method for coding commands on a pseudosample signaling member (control tower) which may be sensed and used to alter the program of an automatic radioactivity measuring system for the following samples. The signaling member is placed in the sample conveyor. It may also direct functions such as group reject.

FIG. 1

INVENTOR.
ROY E. NATHER

BY T.E. Kristofferson

ATTORNEY

SIGNALLING MEMBER AND METHOD FOR PROGRAMMING AUTOMATIC RADIOACTIVITY-MEASURING SYSTEM

This application is a continuation of application Ser. No. 541,674 filed Apr. 11, 1966 now abandoned This invention relates to a system and method for programming automatic radioactivity measuring systems employing a coded, pseudosample, control tower and, move particularly, to such a system in which a tower may be placed in a sample conveyor chain in order to provide information to the system memory for programming it to achieve a desired program for the samples in the chain following the tower.

In liquid scintillation radiation-counting systems, it is common to make measurements on a sample in more than one energy window, when more than one isotope is present, to allow independent quantitative determination of separate isotopes. For example, it is a common practice to measure counts in a tritium and a carbon 14 channel, selected in such a way that the higher energy window is sensitive to carbon 14 only, and can be used to correct for the inevitable spillover of carbon 14 counts into the lower energy tritium window. Additional channels may also be used for other samples of sample combinations. Also, an automatic standardization step is sometimes included in which an external gamma ray standard will be positioned next to the detector and a count taken on the standard, either in the normal data window or windows or in a special energy window or windows to measure the counting efficiency or response of the detector.

The most direct manner of accomplishing this is to use a parallel approach where there are as many discriminators and data accumulation channels as the number of measurements to be made and data are accumulated in all of the channels simultaneously. A more economical approach to the problem is a serial approach wherein a single data accumulation channel is used. In the serial approach, successive counts may be accumulated in a single data channel by switching successively from one energy window to another by means of an automatic program, which frequently will contain a standardization measurement as one step in the process.

The normal approach to the programming function is to set up the pattern of measurement desired by means of selectable panel controls. All samples in the system will then automatically be measured according to the single selected program. Such an approach may not be desirable when more than one type of sample is present. In such case, it would be very desirable to have a means for automatically establishing anew counting program from time to time, as successive batches of different samples approach the counting index position.

Prior art systems also have employed group reject plugs which are placed in a sample position in a conveyor and the presence of which is detected with an arm on a microswitch, or other sensor, in order to cause the system to reject all the samples following the plug until another plug is detected which will serve to reactivate counting action on the following samples. Such plugs, however, do not affect the program set up on the panel. Another prior art approach reactivates the system when the first empty conveyor link appears after the group reject plug.

It is the main purpose of this invention to provide a new and improved method and means for automatically effecting changes in the program of a radioactivity measuring system by use of a pseudosample, which is hereinafter referred to as a control tower, which, when it is in the counting index position, is detected by a sensor which will read out the information coded on the control tower and store it in a memory for use in controlling the program for the following samples.

This and other objects are achieved in one aspect of the invention by providing a control tower programming system for an automatic radioactivity measuring system which is characterized by providing: a control tower, which can be coded with information to select a desired program of two or more steps; a sample conveyor containing at least two positions; means for positioning said tower in a position in said conveyor in front of at least one other conveyor position for which it is intended to set up said program; a tower reader assembly having means for detecting and distinguishing between the presence of a tower or a sample at a counting index position of said conveyor, said assembly also having means for reading said information; a memory connected to said assembly for storing said information; and, means for utilizing said information to effect said program, whereby the system serves to perform the equivalent of automatically modifying the settings of panel controls from time to time, a function which otherwise would have to be performed manually by an operator and which would require his presence whenever a new batch of samples had to be measured.

Another aspect of the invention involves a method of programming an automatic radioactivity measuring system characterized in the steps of; coding information on at least one control tower containing two or more steps, placing at least one tower in position in a sample conveyor having at least two positions, driving successive positions of the conveyor through a counting index position, reading the information coded on a tower when it reaches the counting index position, storing the information read in a memory, and utilizing the information stored in the memory to effect a program for positions following said tower until encountering another tower.

The novel features which are believed to be characteristic of the invention are set forth with particularity in the appended claims. The invention, and further objects and advantages thereof, can best be understood by reference to the following description and accompanying drawings in which:

Figure 1:
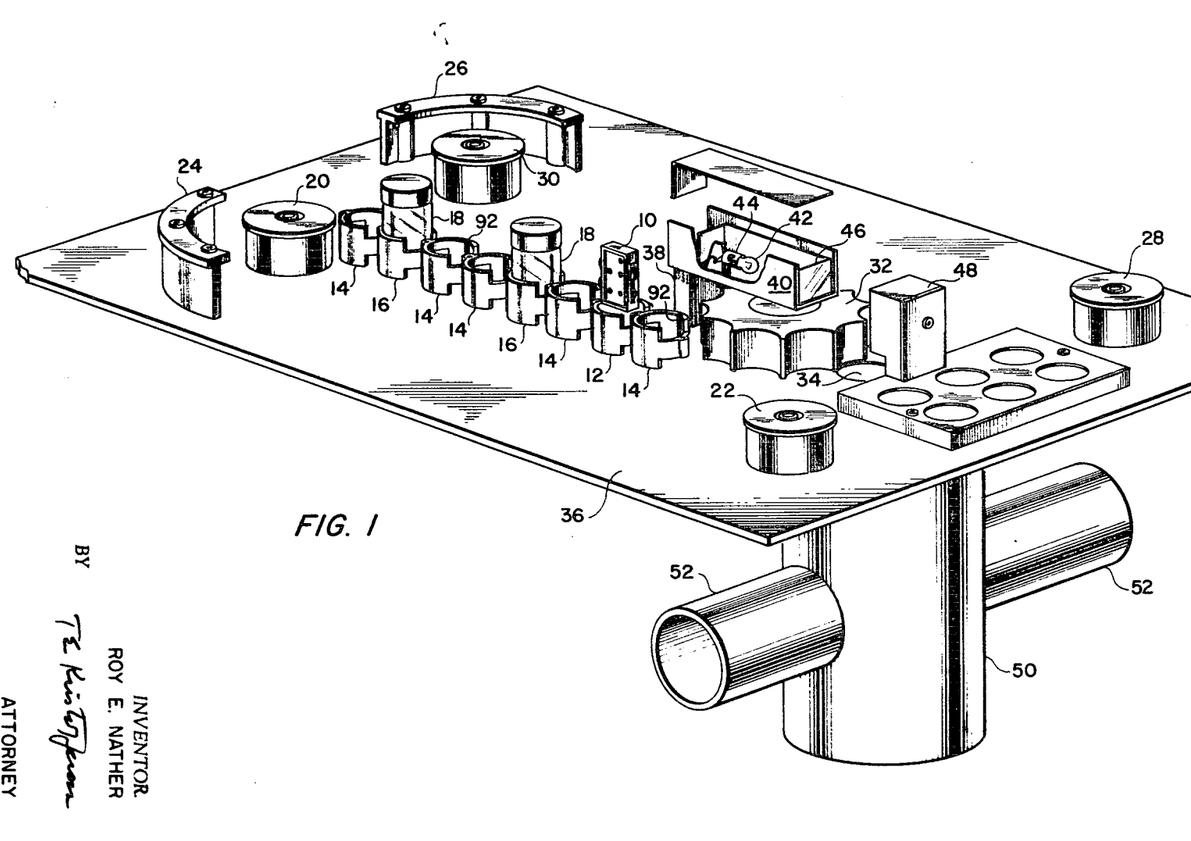
FIG. 1 is an isometric drawing of a sample conveying assembly including a control tower and tower photocell sensing assembly, partly in exploded and partly cutaway view, illustrating a preferred embodiment of the invention.

Turning now to the drawings, in FIG. 1 there is illustrated a preferred embodiment of the invention in which a control tower 10 is inserted in one link 12 of sample conveying chain, which may include a plurality of empty links 14. Other links 16 contain sample bottles 18, which in turn may contain radioactive samples mixed in a liquid solvent such as benzene or toluene containing one or more of numerous commercially available scintillator or fluorescent materials such as PPO or POPOP. Only a portion of the links of this sample-conveying chain are illustrated. It can be seen that the chain, when completed, will run in a counterclockwise manner around the pulley 20, down and in a clockwise manner around the pulley 22, back up and around the outside of the chain guide rail 24, over and around the outside of the chain guide rail 26, down and clockwise around the pulley 28, back and counterclockwise around the pulley 30, and down and clockwise around the drive sprocket 32. Drive sprocket 32 is used to drive the conveyor chain and to index the links thereof directly over the elevator shaft access hole 34, through the conveyor base plate 36 upon which the pulleys 20, 22, 28 and 30 and guide rails 24 and 26 are mounted. The position directly over hole 34 is referred to as the counting index position. A chain, such as illustrated, is disclosed more fully in a copending application entitled "Sample Conveying Chain for Liquid Scintillation Spectrometer" now U.S. Pat. No. 3,354,740—R. E. Cannon, filed concurrently herewith and assigned to the assignee of the present invention.

A tower lamp support post 38 supports a tower lamp assembly 40 on the conveyor base plate 36 and extending outwardly over the drive sprocket 32. The assembly 40 contains an incandescent lamp 42, mounted in a socket 44, such that the light from the lamp 42 is directed through a lamp tower lens and filter combination 46 for directing light of a selected wavelength on a tower photocell detector assembly 48. When a link of the conveyor chain is indexed in the counting index position, in front of the assembly 48, the photocells (not illustrated) contained in assembly 48 detect whether or not the link contains a control tower, a sample bottle, or is empty, in a manner to be described.

Figure 3:
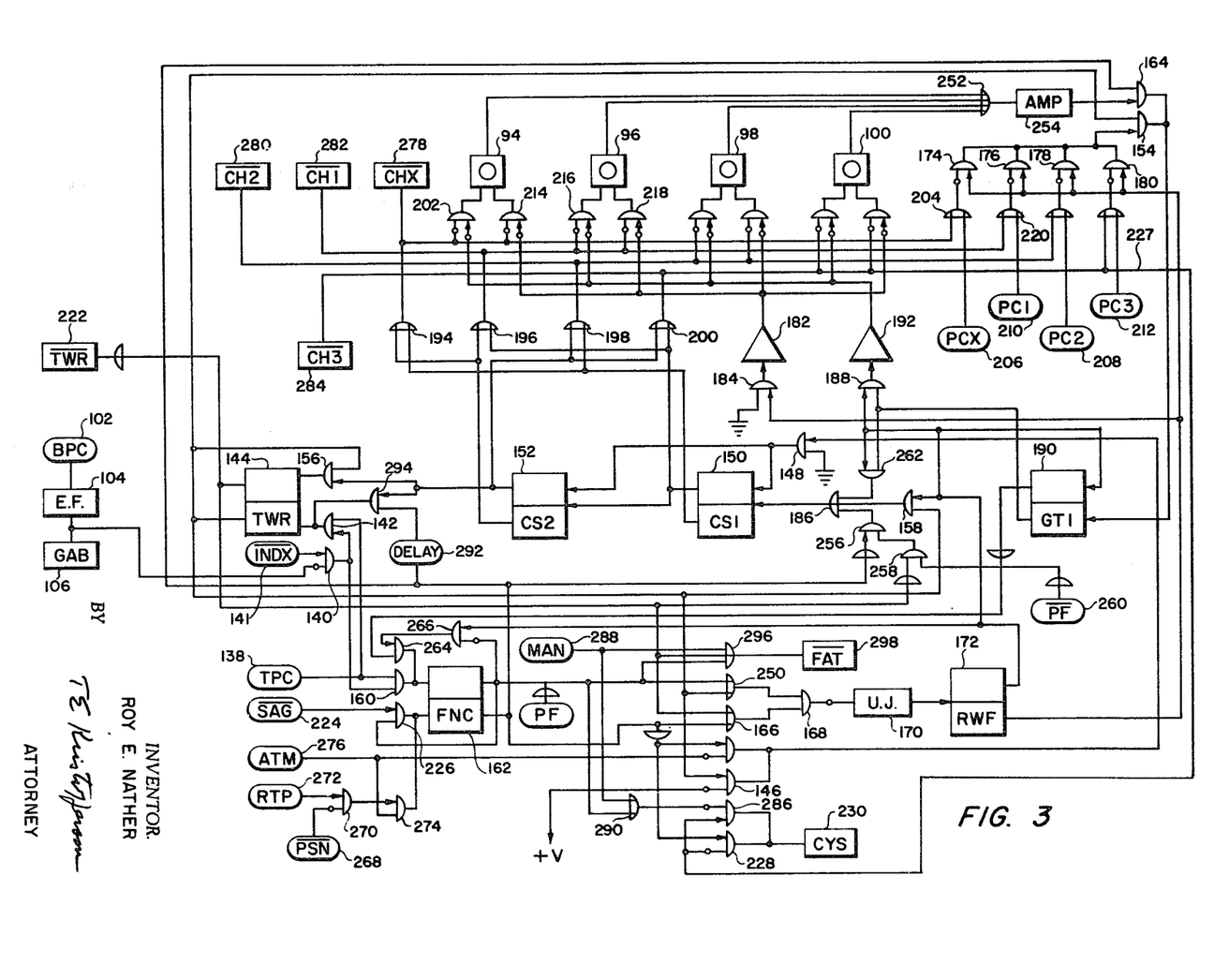
FIG. 3 is a symbolic logic circuit diagram of one embodiment of a memory and associated logic circuitry which may be used in conjunction with a control tower and system, such as illustrated in FIGS. 1 and 2, to store the selected program and direct its implementation; and, FIG. 4 is a symbolic logic circuit diagram of none embodiment of sample changer conveyor and elevator controls for actuating the elevator and conveyor associated with the system of the foregoing figures.
Figure 4:
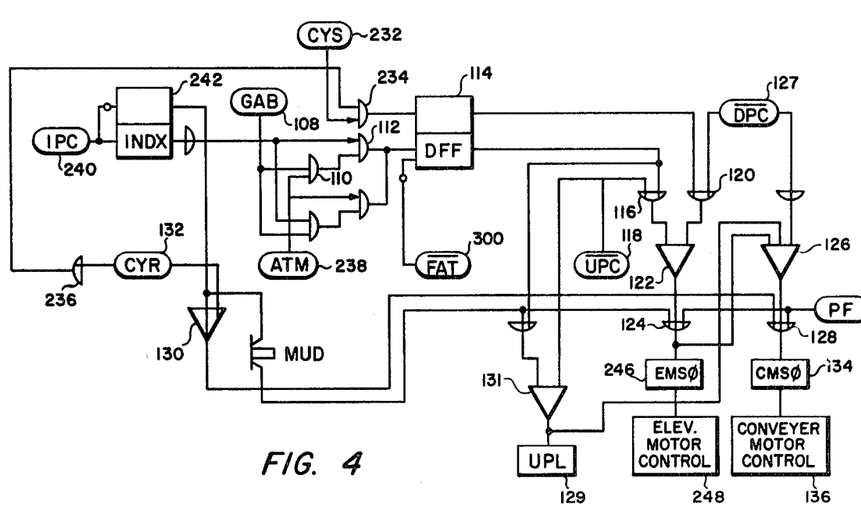

In the event the link is empty, the photocell assembly 48 and associated circuitry will initiate a command for the drive sprocket 32 to advance the chain to index the next link in the counting index position by means of a conveyor drive mechanism (not illustrated) and the circuitry of FIG. 4. An example of such a conveyor drive and indexing mechanism is disclosed in copending application entitled "Conveyor Drive and Indexing Mechanism for Liquid Scintillation Spectrometers" now U.S. Pat. No. 3,354,740—R. E. Cannon, filed concurrently herewith and assigned to the assignee of the present invention. In the event the presence of a tower is detected, the information coded on the tower will be read and stored in the memory of FIG. 3 in order to program the system in accordance with the information coded on the tower. In the event that a sample bottle is detected, the photocell assembly 48 and associated circuitry will initiate a command for an elevator drive mechanism (not illustrated), controlled by the circuitry of FIG. 4, to lower the sample bottle down through hole 34 into a counting chamber contained in the cylinder 50, mounted below plate 36, which will position the sample bottle between two photomultiplier counting tubes contained in the cylindrical extensions 52, on opposite sides of the cylinder 50. The information coded on the last previous control tower will then provide the program to be carried out on the sample, it will be returned to the conveyor, and the next link will be indexed into position. The elevator mechanism may be of the type disclosed in a copending application entitled "Sample Changing Elevator and Light Sealing Mechanism for Scintillation Counting" Ser. No. 541,654—R. E. Cannon, filed concurrently herewith and assigned to the assignee of the present invention.

Figure 2:
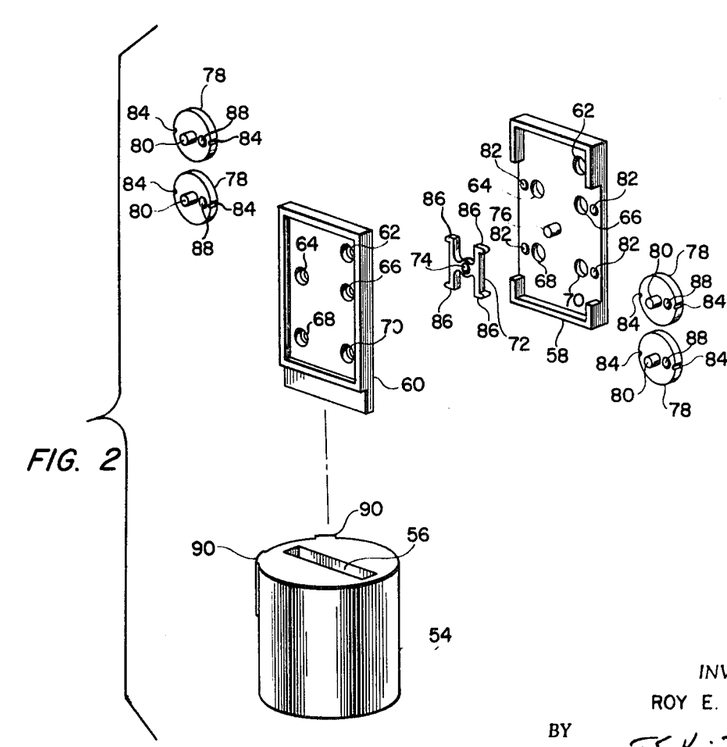
FIG. 2 is a three-dimensional, exploded assembly drawing of one embodiment of a control tower which may be used in the system of FIG. 1.

The method of operation of the tower lamp assembly 40 and the tower photocell detector assembly 48, in conjunction with the control tower 10, the sample bottles 18 and the empty links 14, will be described further after considering a detailed embodiment of the control tower 10 illustrated in a exploded view in FIG. 2, in which a base 54, cylindrical in nature to conform with the inside of conveyor links 12, 14 and 16 of FIG. 1 which contain the samples in the associated liquid scintillation system, includes a rectangular slot 56 for receiving a control tower body 58 and cover plate 60, which may be cemented together and into the slot 56. Body 58 and cover plate 60 have matching holes 62, 64, 66, 68 and 70 through which light can pass when the tower is assembled.

A detent 72, containing a central hole 74, is mounted on a rod 76, extending outwardly from body 58. Thumbwheels 78, having axles 80, are mounted in holes 82 in body 58 and in corresponding holes (not illustrated) on the backside of cover 60. Two semicircular cutouts 84 are made on opposite extremities of a diameter of each of the thumbwheels 78 for cooperation with semicircular extremities 86 of the detent 72. Also, along the same diameter between the cutouts 84, a hole 88 is made between the axle 80 and cutout 84, such that when a thumbwheel 78 is positioned with the cutout 84 on one side, engaging the detent extremity 86 associated therewith in a spring lock fashion, the hole 88 is aligned with its corresponding hole 64, 66, 68 or 70 in body 58 and cover 60. When the thumbwheel 78 is rotated so that the opposite cutout 84 engages the detent extremity 86, the thumbwheel serves to block off the hole, preventing the passage of light therethrough.

In the detailed embodiment described herein, the control tower 10 is used such that the presence of hole 62 and the absence of a hole horizontally to the left thereof and in vertical alignment with the holes 64 and 68, is used to generate a signal indicating the presence of a control tower. The hole 64 is used to program the external standardization step. The hole 68 is used to indicate whether or not channel 1 is to be counted, hole 66 is used correspondingly for channel 2, and hole 70 for channel 3. The thumbwheels 78 may be color coded for easy identification with their corresponding channel or function.

It will be understood, of course, that the particular embodiment of the control tower described herein is only one embodiment of a control tower which may be used in the present invention. The tower 10 is used in conjunction with the photocell sensing system, including the assemblies 40 and 48 of FIG. 1, by means of which the light 42 is shined on the control tower and the condition of the holes detected by assembly 48. Photocells are placed in assembly 48, opposite the holes 62, 64, 66, 68 and 70 when the tower is in the counting index position over hole 34, to detect whether the holes are open or closed. The corresponding photocells are designated BPC (bottle photocell), RCX (photocell external standard channel), PC2 (photocell channel 2), PC1 (photocell channel 1) and PC PC3 (photocell channel 3), respectively. Another photocell, designated TPC (tower photocell), is positioned to the left of hole 62 and above holes 64 and 68 to assist in differentiating between the presence of a control tower 10, a sample bottle 18, or an empty conveyor link 14.

The base 54 can also be seen to contain two keys 90, which serve to cooperate with keyways 92 in the links 12, 14, 16 of the sample conveying chain of FIG. 1, to rotationally orient base 54 and the holes in body 58 and cover 60 with the associated assemblies 40 and 48. Obviously the tower could be cylindrically symmetrical, obviating the need for rotational orientation, but the above described embodiment is preferred.

The control tower, used in connection with the subject invention, could take a variety of forms and a variety of sensing means could be associated therewith. As an example, a stepped device cooperation with a plurality of microswitches could be employed, or a color-coded device cooperating with a reflective system. However, the system presently described in detail has obvious advantages. Accordingly, the foregoing control tower and sensor have only been described by the way of example and it is not intended to limit the present invention thereto.

The result achieved by the invention is equivalent to automatically modifying the settings of panel controls from time to time by means of the control tower 10, a function which otherwise would have to be performed manually by an operator and which would require the presence of the operator whenever a new batch of samples has to be measured. With the invention, it is possible to count several batches of samples in an automatic and unattended manner, with separate measuring programs performed on each batch of samples, or with rejection of designated batches, by the use of a simply coded pseudosample, external to the programming and operating circuitry of the system.

In the embodiment described, an open window or hole causes light to fall on the corresponding photocell and indicates a "no" or "false" condition. Conversely, in the "yes" OR "true" condition, the appropriate window in the control tower 10 is closed by the associated thumbwheel 78 and the associated photocell inactivated. The photocell array is only read when the conveyor link is in the counting index position to determine whether the link is empty or contains a tower or a bottle. Then TPC is true, due to the light being cut off by the upper left portion of a tower, and BPC is false due to light passing through a hole 62, a control tower rather than a sample has been interposed between the light 42 and photocell assembly 48. Read-in and memory circuitry, to be described in connection with FIG. 3, is activated immediately upon leaving the counting index position and transfers the programming information from the control tower to the internal program memory, consisting of a set of magnetic cores 94, 96, 98, 100 of FIG. 3, one core for each programming command for each of the four channels. The direction of the magnetization of the core corresponds to a "yes" or "no" condition on the control tower. Magnetic cores are desirable since they do not lose their memory after power failure. When the system comes back on, the cores still are in the same state. Cores have the disadvantage that you cannot just look at them and tell what state they are in, either physically or electrically. The only way you can find out what state they are actually in is to try to reset them to zero. If you reset them to zero and they were actually a one, you get a big signal out. If they were already zero, you do not get any signal out. Obviously, any other form of memory could be employed in carrying out the present invention.

When a tower is identified, the cores are cleared and the new information coded on the tower is set in. Any time that it is desired to find out what information is in the core memory, the cores are cleared and then the same information written back in again if it is desired to keep it there.

The control tower 10, already described, and the logic circuitry of FIG. 3, to be described, illustrate an embodiment in which the programming can be modified to count or not to count external standard, channel 1, channel 2 and channel 3, in that order. However, it is obvious that if for any reason it were desired to alter the order of counting of the channels, this could also be accomplished by modifying the logic appropriately in any of several obvious ways. Also such a control tower system can obviously be used to program a parallel counting system as well as a single channel system with multiplexed discriminators.

Turning now to the logic diagrams of FIGS. 3 and 4, the operation is as follows. When a conveyor link is indexed into the counting index position, the photocell array in assembly 48 determines whether or not the link is empty or contains a tower or a bottle. First, we will consider what happens when the first empty link 14 of FIG. 1 arrives at the index position. Light shines on the bottle photocell, and BPC input 102 is false. Input 102 is connected through an emitter-follower 104 to GAB (got a bottle) output 106, which in turn is connected to a GAB input 108 in FIG. 4. Input signals are contained in ovals and outputs in rectangles. Input 108 will remain false for as many empty conveyor links as will be present. Since input 108 is false, AND gate 110 is disqualified, disqualifying AND gate 112 in turn and leaving bistable multivibrator DFF (down flip-flop) 114 in its false state, i.e., with its lower half false. As long as multivibrator 114 is in the false state, the conveyor will continue running due to the presence of false inputs on OR gate 116, from the lower side of DFF-114 and $\overline{UPC}$-118 (up photocell not) which is false since the elevator is in the "up" position. A bar over a symbol designates the symbol with negation indicated, in either case "not up photocell" which is false since the elevator is up and UPC (up photocell) is true. The true output from the topside of DFF-14 goes to one side of OR gate 120 such that its output is true. The inputs to NAND gate 122 are then false from gate 116 and true from gate 120, yielding a true output through OR gate 124 to NAND gate 126. The other inputs to NAND gate 126 are $\overline{DPC}$ (not down photocell) 127 which is true and comes from a photocell associated with the sample elevator (not illustrated) indicating when the elevator is in the down position, and UPL (up light) 129 which is true also since $\overline{UPC}$-118 was false, as indicated above, and one false input to NAND gate 131 yields a true output. Thus, the output of NAND gate 126 is false since all its inputs are true and provides a false input to OR gate 128. The other inputs to OR gate 128 are PF (power failure) which is false, and the output of NOR gate 130. Since CYR (cycle repeat) input 132 to gate 130 is true, the output of NOR gate 130 is false. Therefore, all inputs to OR gate 128 are false so its output is false, so that CMS$\phi$ (conveyor motor shutoff) signal 134 is false and does not shut off the conveyor motor control 136, which will then continue to run the conveyor until the next link is in the counting index position, searching for a bottle or a tower.

Assuming the next link 12 of FIG. 1, containing the tower 10 with information dialed in it to count external standard (by blocking hole 64 with its associated thumbwheel 78) and to count channel 2 (by blocking hole 66 with its thumbwheel 78), is next indexed into the counting index position, the following will happen. The upper left corner of the tower will block light from shining on TPC, generating a true TPC input 138 in FIG. 3. Light will shine on BPC through hole 62 and the BPC input 102 will be false, not inhibiting AND gate 140 through emitter-follower 104. A gate with a small circle on an input lead designates a true inhibit or false enable, which are equivalent. However, since $\overline{INDX}$ (not in index) input 141 is false, there is no true output from AND gate 140 to AND gate 142, such that there is no true output from it to set bistable multivibrator TWR (tower multivibrator) 144 to its true or lower state. However, when the conveyor starts to move to the next position, $\overline{INDX}$ becomes true, indicating no longer exactly in index, and since BPC input 102 is false, AND gate 140 has a true output which, together with the true signal from TPC input 138, yields a true signal at the output of AND gate 142, causing TWR-144 to be set to its lower or true state. A true output from the lower side of TWR-144 goes to one input of AND gate 146, the other input of which is always enabled by the signal +V. A true output goes from AND gate 146 to one input of AND gate 148, the other input of which is always enabled by grounding, yielding a true output from AND gate 148, which would reset bistable multivibrator CS1 (channel sequencer 1) 150 and bistable multivibrator CS2 (channel sequencer 2) 152 to their lower states false, if they were not already in that condition.

Returning to TWR-144, the true output from its lower half goes to the DC leg of AND gate 154 to enable it. Tower 144 also enables the DC leg of AND gate 156, which will reset TWR-144 false after a scale of four into the channel sequencers 150 and 152. TWR-144 is also true to the DC leg of AND gate 158 to enable it, which allows the channel sequencers 150 and 152 to be advanced when reading a tower.

Returning to TPC input 138, which is true, it, together with the true input from AND gate 140, enables AND gate 160 to reset FNC (find new channel) bistable multivibrator 162 to its false state on its lower half. The lower half of FNC-162 being false, disqualifies AND gate 164, preventing it from reading out information which may have been stored in the cores 94, 96, 98, 100 previous to finding a tower. The output of FNC-162 also goes to one input of OR gate 166, whose other leg is connected to the false side of TWR-144. The output of gate 166 is then false into AND gate 168, the output of which is then false. This false signal serves to enable unijunction oscillator 170, which is true inhibited, which then will oscillate, generating pulses with a period of 1.5 milliseconds, which will trigger bistable multivibrator RWF (read-write flip-flop) 172 continuously until oscillator 170 is again disabled.

The true read pulse from the lower half of RWF-172 will send a true pulse to AND gates 174, 176, 178 and 180 in parallel and will also address NAND gate 182 through AND gate 184, the other side of which is enabled true by connecting it to ground. The next trigger pulse from unijunction oscillator 170 will cause RWF-172 to be true on its top side causing a true output to go into AND gate 158 and, since the other side of AND gate 158 is already true as mentioned previously, it will have a true output which will go through OR gate 186 to trigger CS1-150 to advance the channel sequencers 150 and 152. The write pulse from RWF-172 will also address AND gate 188, the DC leg of which will be qualified when the lower half of bistable multivibrator GT1- (got a one) 190 is true. The true output of AND gate 188 will then go to NAND gate 192 and appear as a false pulse at its output to write information into the cores 94 to 100 in accordance with the following described sequence.

Returning to channel sequencers 150, and 152, we will now discuss the decoding of the various lines to the cores through OR gates 194, 196, 198 and 200 to enable the cores in sequence and to qualify AND gates 174, 176, 178 and 180, in sequence, to write information into the cores 94 to 100 sequentially. Since the sequencers 150 and 152 were reset so that their lower sides are false, the two inputs to OR gate 194 are false. The output of OR gate 194 is false going into the false enabled DC leg of AND gate 202. The output of gate 194 will also put a false input into OR gate 204. Since, as previously described, the tower had information coded on it to yield true signals on PCX input 206 and PC2 input 208 and false signals on PC1 input 210 and PC3 input 212, a true signal will appear on the other input to OR gate 204 which will have a true output, which in turn will inhibit AND gate 174. When AND gate 174 is then addressed by the read pulse from the lower side of RWF-172, no output will then appear and there will be no output from AND gate 154 consequently to GT1-190 which will remain false. GT1-190 will then keep a false signal on WRITE gate 192 through AND gate 188, which will prevent writing any information into core 94 through AND gate 202. If there was a one previously in core 94, RWF-172 puts a true signal through AND gate 184, which is inverted by NAND gate 182 to tell core 94 to go to zero through AND gate 214, since its other side was false enabled coming from OR gate 194.

The true pulse from the top side of RWF-172 also goes through AND gate 158, the other side of which is connected to TWR-144 true, and through OR gate 186, as previously described, to trigger the sequencers 150 and 152 to their next state, which will be true on the bottom half of CS1-150. Both inputs to OR gate 196 coming from the top half of CS1-150 and the bottom half of CS2-152 are then false and the output of gate 196 is false, addressing AND gates 216 and 218 and OR gate 220. The next pulse from unijunction 170 places RWF-172 in its read state with the lower side true, which addresses one input to AND gate 176, the DC leg of which is now enabled through OR gate 220 by both inputs being false, since PC1-210 is false as per the aforementioned code. This will yield a true pulse out of gate 176 and a true pulse out of AND gate 154, the other side of which is connected to TWR-144 true, and we will get a true output from AND gate 154 to GT1-190 setting it to a true condition on its lower half. The true pulse from RWF-172 will also go through AND gate 184 and NAND gate 182 to read the information out of core 96 through AND gate 218, setting core 96 to zero since the magnetic core is a destructive memory. The next pulse from unijunction 170 triggers RWF-172 to its upper or write state true, which in turn addresses AND gate 188 to NAND gate 192 to write information through AND gate 216 in to the core 96. The DC leg of AND gate 188 is connected to the lower true side of GT1-190 such that a one is then written into core 96 through AND gate 216.

A zero is now written in the core 94 and a one into the core 96. The same write pulse from RWF-172 goes to reset GT1-190 with its upper half true and also goes through AND gate 158 and OR gate 186 to sequencers CS1-150 and CS2-152, which will now be zero in the lower half of CS1-150 and 1 in the lower half of CS2-152. Both inputs to OR gate 198 will then be false coming from the lower half of CS1-150 and the upper half of CS2-152. The manner of reading the information into the associated core 98 is the same as that for reading the similar signal through OR gate 194 into core 94. The same sequences of pulsing RWF-172 with the unijunction oscillator 170 is then followed again, putting false signals on both inputs to OR gate 200 and writing information into the core 100 in the same way as it was written into the core 96.

Upon writing the information into core 100, the RWF-172 would also advance the channel sequencers 150 and 152 to their original condition of 0,0 in their lower sides, and an output of true from the upper side of CS2-152 would go through gate 156 to reset TWR-144 to its false condition, i.e., its upper side true.

When TWR-144 goes false, an input leg of OR gate 166 goes true from $\overline{\text{TWR}}$, the top of TWR-144 and the output of OR gate 166 goes true. Both inputs to gate 168 are then true and its output is true, shutting off unijunction oscillator 170.

$\overline{\text{TWR}}$ output 222 then is in the true condition, and goes through an AND gate in another portion of the circuit (not illustrated) to a monostable multivibrator to trigger it to generate a SAG (start again) true signal which then returns, after a time delay, to false such that $\overline{\text{SAG}}$ returns to the circuit of FIG. 3 as $\overline{\text{SAG}}$ input 224 true and goes through AND gate 226, since the upper true side of FNC-162 is connected to the other input to set FNC-162 to its lower state true. Since channel 3 false on line 227 coming from OR gate 200 still false enables AND gate 228 and FNC-162 puts a true pulse on its other input, there is a true output from gate 228 generating an output signal CYS (change your sample) 230 which comes into FIG. 4 as CYS-232 input to AND gate 234 whose DC leg is qualified through OR gate 236, which is qualified in turn by the CYR (cycle repeat) input 132. The output from AND gate 234 goes into the top side of DFF-114 to assure that it is true, or in the same condition as it wall left in the last sample-changing operation to maintain the conveyor in motion. The conveyor will then index to the next position in the manner previously described.

Since the next link 14 in FIG. 1 is empty, the circuit will repeat the operation that it went through on the previous empty link 14 prior to the tower link 12 and the conveyor will index again into the next position, presenting the link 16 containing the bottle 18 in the counting index position to the photocell assembly 48.

BPC-102 is then true, since light through hole 62 is blocked by the cap of the sample bottle, and GAB-106 output is true. GAB-108 input, FIG. 4, is true and since ATM (automatic mode) input 238 is also true by setting it so on the control panel for automatic operation, gate 110 is qualified and in turn qualifies gate 112 since, upon an index position of the conveyor, the other input to gate 112, coming from IPC (index photocell) 240 to set the lower side of INDX (index) bistable multivibrator 242, is also true. DFF-114 now goes true on its lower side and its output is true into OR gate 116 whose output is now true. $\overline{\text{DPC}}$ input 127 is true, qualifying NAND gate 122 through OR gate 120, whose output is then false. A false output from gate 122 will yield a false output from gate 124 which, in turn, will yield true output from gate 126. This gives a true output from gate 128 actuating CMSφ-134 to conveyor motor control 136 stopping the conveyor on the index position. The false output coming out of gate 124 will permit EMS (elevator motor shutoff) 246 to actuate the elevator motor control 248, causing the elevator to run and lowering the sample bottle down between the photomultiplier tubes in the containers 52 of FIG. 1.

When FNC-167 went true in its lower state to actuate the CYS-230 signal and cause the sample to be changed, its upper side placed a false output on one input to OR gate 250, which then in turn has a false output since the other input to OR gate 250 is false from the lower side of TWR-144. Therefore, the output of gate 168 goes false and unijunction oscillator 170 will commence cycling again. FNC-162 going true in its lower state also qualified the DC side of gate 164 which then will permit information to be read out of the cores 94, 96, 98, 100 through OR gate 252 and amplifier 254.

Note AND gate 256, which was qualified by having its DC leg set through AND gate 258 whose inputs are $\overline{\text{PF}}$ (power fail not) 260 and $\overline{\text{TWR}}$-144 which are both true. However, it takes longer for a DC leg to return to zero than it takes for a true pulse to be generated and clear a particular gate. Consequently, from the time TWR-144 switches false, on completing the readout of the previous tower, to the time that the $\overline{\text{TWR}}$ output signal 222 generates a $\overline{\text{SAG}}$ input signal 224 and FNC-162 goes true, the pulse generated by FNC-162 will not get through gate 256 and will not cause the channel sequencers CS1-150 and CS2-152 to move out of their 0,0 as would appear to be the case if it was not for the clearing action between the DC and AC legs of gate 256.

RWF-172 goes true on its lower side on the next pulse from unijunction oscillator 170, generating an input of true to gate 184 and false from gate 182, which will request a read from core 94 through gate 214. Since core 94 is already in its zero state, the signal driving it to zero does not change the magnetization on the core and no pulse is sent from the core through OR gate 252 and amplifier 254 through the gate 164. GT1-190 then receives no pulse and remains false. The output from GT1-190 being false, there is no command through gates 188 and 192 to write a signal back into core 94 through gate 202. Also, the false signal from the lower side of GT1-190 goes to a DC input on AND gate 262 which cannot pass a true signal to OR gate 186 to cause the channel sequencers CS1-150 and CS1-152 to move to their next position.

This then indicates that we have found the particular channel to be counted, CHX (the external standard channel). The true side, or upper side of GT1-190, qualifies the DC leg of AND gate 264, the other side of which is enabled by the output from AND gate 266, which in turn is enabled by a true signal from the top of RWF-172 and a false enable signal from the top of FNC-162. The output of gate 264 is then true, resetting FNC-162 false or true in its upper side which will then shut off unijunction oscillator 170 through gates 250 and 168, as previously described. This all takes place long before the bottle 18 reaches its down position in chamber 50.

When the bottle, which was previously started down the elevator, reaches the down or counting position between the photomultiplier tubes, $\overline{DPC}$-127 will go false instituting a counting cycle in another portion of the system not illustrated. Upon the completion of the counting cycle and a command signal to print out the sample number, a false signal $\overline{PSN}$ (print sample number not) 268 false enables AND gate 270. The other input to AND gate 270 is RTP (ready to print) input 272, which is also true when printing is completed, yielding a true output from gate 270 to one input of AND gate 274. The other input to gate 274 is ATM (automatic mode) input 276 which is also true such that gate 274 sends a true output to FNC-162 setting it true, causing the system to find a new channel in the manner previously discussed.

FNC-162 actuates RWF-172 in the manner previously described, and on the read pulse, with the lower side of RWF-172 true, an input is addressed through gates 184 and 182, which commands the core 96 to go to zero through gate 218. Since this core was previously in the 1 condition, there id a large change in flux generating an output signal from core 96, which is fed through OR gate 252 and amplifier 254 to AND gate 164 and in turn, through it, since its outer input from FNC-162 is true, to GT1-190 setting it true. GT1-190 being true enables gate 188 when RWF-172 changes to the write state on the next pulse of oscillator 170. The true pulse from the upper side of RWF-172 will go through gates 188 and 192 to write a 1 back into core 96, through gate 216. At this time, GT1-190 also sends a true pulse from its lower side through gates 262 and 186 to trigger CS1-150 and CS2-152 to their next position in the sequence, which will be to read core 98. The readout of core 98 is similar to that previously described concerning core 94 and the system will stop with the command to accumulate data on the sample in the same manner as with the external standard channel. When core 94 indicated that the external standard channel was to be counted, there was also an output on $\overline{CHX}$ (channel X not) 278 which would set up the discriminators in the counting circuit (not illustrated) to count the associated external standard channel. Likewise, when the system stops on core 98, indicating that channel 2 is to be counted, there is an output on $\overline{CH2}$ (channel two not) 280 setting the discriminators to count that channel. When core 96 was passed over, there was no output on $\overline{CH1}$ (channel one not) output 282 to set the system for counting in that channel. After core 98 causes channel 2 to be counted, we again get the inputs $\overline{PSN}$-268 and RTP-272 to sequence the system in the manner previously described to read the core 100, which will be as described in connection with the reading of core 96, which will be as described in connection with the reading of core 96, since this core also contains a 1.

When we have finished writing a 1 back into core 100, the $\overline{CH3}$ (channel three not) output 284 line 227 will return to the true state after a period of only 1.5 milliseconds, the period of unijunction oscillator 170. This signal will go down and through AND gate 286. Because the $\overline{MAN}$ (manual switch) input 288 if false and the FNC-162 is false in its upper state, the other input to gate 286 is false enabled to its DC leg through OR gate 290. This then gives a true output from gate 286, initiating a CYS output 230 to the sample changer causing the conveyor to index to the next link as previously described.

Considering one other possible set of circumstances, if all the holes are open on the control tower 10 this will initiate a group reject action for the following samples by indicating that no channel is to be counted. TWR-144 would go true. We would find all ones coded on the tower 10 and cores 94, 96, 98 and 100 would all have ones set into them. TWR-144 would then trigger false through AND gate 156. The signal $\overline{TWR}$-222 would initiate $\overline{SAG}$-224 which would set FNC-162 in a true state. This will start unijunction oscillator 170 running again to initiate read-write action in the manner previously described. FNC-162 true, delayed by delay 292 for 2 milliseconds, will present a true signal at AND gate 294. The next time after four counts in CS1-150 and CS2-152, a true pulse goes to the other side of gate 294, setting TWR-144 true. TWR-222, $\overline{MAN}$ input 288 and FNC-162, false side, being false, presents three false inputs to OR gate 296. This generates FAT (find a tower not) output signal 298. This goes as an input signal FAT-300 into FIG. 4 which will turn the lower side of DFF-114 off and keep it off until we find a new tower, preventing GAB signal 108 from causing any subsequent bottles to be lowered by the elevator.

Since the principles of the invention have now been made clear, modifications which are particularly adapted for specific situations without departing from those principles, will be apparent to those skilled in the art. The appended claims are intended to cover such modifications as well as the subject matter described and to only be limited by the true spirit of the invention.

What is claimed is:

1. A radioactivity measuring system for independent qualitative determination of separate isotopes in different batches of radioactive samples by liquid scintillation radiation counting accumulated automatically in a plurality of energy level measurement channels selected in response to specific measurement programs inserted into said measuring systems comprising:

a conveyor means having a multiplicity of links into which sample bottles may be inserted;

a plurality of control towers each having coded information preset into a multiplicity of holes at least one of said control towers being placed into a particular one of said links and said coded information containing one or more of a multiplicity of measurement channel commands to be performed upon such sample bottles as may be inserted in following links;

an indexing means to position one of said links in a counting index position;

a detector assembly means producing a first signal when a link in said counting index position is empty, a second signal when said link contains a sample bottle, and third signal when said link contains a control tower, said detector assembly means also having a coded output signal generated in response to said holes of said control tower when said detector assembly means third signal is present;

a conveyor drive mechanism means responsive to said detector assembly means first signal to advance said conveyor to move a next following link into said counting index position until said detector assembly means produces a second or third signal;

a memory means for storing said detector assembly coded output signal when said detector assembly means third signal is present;

a memory write-in means for writing said detector assembly coded output signal into said memory when said detector assembly means third signal is present;

a memory reading means for determining the contents of said memory when said detector assembly means second signal is present;

a counting chamber means into which a sample bottle is positioned for measurement;

an elevator means responsive to said detector assembly means second signal to lower said sample bottle from said index position into said counting chamber for measurement and to return said sample bottle to said index position after said measurement; and, a logic means responding to said memory reading means for connecting to said counting chamber means a sequence of one or more measurement channels corresponding to said measurement channel commands when said detector assembly means second signal is present and said elevator means has lowered said sample bottle into said chamber.

2. The measurement means described in claim 1 wherein said control tower means comprises:

a control tower body member having a surface into which a multiplicity of holes are positioned;

a plurality of thumb wheels equal in number to said control tower body holes and mounted upon said control tower body so as to rotate, each of said thumb wheels of having a hole positioned in such a manner to coincide with said tower body holes as said thumb thumbwheels are rotated, each of said thumb wheels also having a small semicircular cutout at one point in a circumferential edge;

a detent means cooperating with said semicircular cutouts in said thumbwheels to indicate alignment of said thumbwheel holes with said tower body holes;

a tower body cover plate member fastened to and covering said tower body with mounted thumbwheels, thumbwheel plate having holes matching said tower body holes, said cover plate and said tower body mating in such a manner so as to permit said thumb wheels to be rotated; and, a cylindrical tower base member to conform to the inside of said conveyor links said base member having a rectangular slot at one end along a diameter so as to receive and fasten to a tower body and cover plate assembly.

3. The measurement means described in claim 1 wherein said detector assembly means comprises:

a tower lamp assembly having an incandescent lamp;

a lamp tower lens and filter combination for transmitting light of a selected wavelength from said tower lamp assembly to said link index position; and, a tower photocell detector assembly having a multiplicity of photocells responsive to such a light pattern as may be received from said link index position.

4. The measurement means described in claim 1 wherein said memory means comprises:

a plurality of magnetic cores each having a direction of magnetization corresponding to a part of said detector assembly coded output signal said magnetic cores retaining said direction of magnetization after a power failure.

PO-1050
(5/69)

UNITED STATES PATENT OFFICE
CERTIFICATE OF CORRECTION

Patent No. 3,604,935        Dated September 14, 1971

Inventor(s) Roy E. Nather

It is certified that error appears in the above-identified patent and that said Letters Patent are hereby corrected as shown below:

Column 1, line 8,    "move" should be --more--;
" 1, " 22,    "of" should be --or--.

Column 2, line 42,    "none" should be --one--;
" 2, " 71,    "3,354,740" should be --3,348,658--.

Column 3, line 48,    "a" should be --an--.

Column 4, line 23,    "RCX" should be --PCX--;
" 4, " 25,    delete "PC", (first occurrence);
" 4, " 52,    "has" should be --had--;
" 4, " 67,    "Then" should be --When--.

Column 5, line 53,    "either" should be --this--;
" 5, " 55,    "DFF-14" should be --DFF-114--.

Column 6, line 20,    after "is" insert --still--.

Column 8, line 19,    "wall" should be --was--;
" 8, " 42,    after "yield" insert --a--;
" 8, " 46,    "EMS" should be --EMSØ--;
" 8, " 53,    "has" should be --had--;
" 8, " 70,    after "0,0" insert --condition--.

Column 9, line 14,    "CS1-152" should be --CS2-152--;
" 9, " 44,    "id" should be --is--;
" 9, " 47,    "outer" should be --other--;
" 9, " 73,    after "96" delete "which will be described in con---.

Column 10, line 1,    delete "nection with the reading of core 96";
" 10, " 8,    "if" should be --is--;
" 10, " 28,    "TWR" should be --TWR--;

PO-1050
(5/69)

UNITED STATES PATENT OFFICE
CERTIFICATE OF CORRECTION

Patent No. 3,604,935          Dated September 14, 1971

Inventor(s) Roy E. Nather          (continued - page 2)

It is certified that error appears in the above-identified patent and that said Letters Patent are hereby corrected as shown below:

Column 10, line 30,   "FAT" should be --$\overline{\text{FAT}}$--;
"      10,   "  31,   "FAT-300" should be --$\overline{\text{FAT}}$-300--.

Column 11, line 22,   after "said" (second occurrence) insert --counting--;
"      11,   "  29,   after "wheels" delete --of--;
"      11,   "  31,   after "said" delete --thumb--.

Column 12, line 7,    delete "thumbwheels" (second occurrence) and insert --said cover--.

Signed and sealed this 9th day of May 1972.

(SEAL)
Attest:

EDWARD M.FLETCHER,JR.                    ROBERT GOTTSCHALK
Attesting Officer                         Commissioner of Patents